No. 896,226. PATENTED AUG. 18, 1908.
F. C. MILLER & O. BUTZKE.
MOTOR FRAME AND GEAR.
APPLICATION FILED JULY 10, 1907.

2 SHEETS—SHEET 1.

Witnesses
Fordyce W. Brown.
W. K. Hale.

Inventors
Frederick C. Miller,
and Otto Butzke,
By atty. N. DuBois

No. 896,226. PATENTED AUG. 18, 1908.
F. C. MILLER & O. BUTZKE.
MOTOR FRAME AND GEAR.
APPLICATION FILED JULY 10, 1907.
2 SHEETS—SHEET 2.

Witnesses
Fordyce H. Brown.
H. K. Hale.

Inventors
Frederick C. Miller
and Otto Butzke.
by atty. N. Dukris.

UNITED STATES PATENT OFFICE.

FREDERICK C. MILLER AND OTTO BUTZKE, OF SPRINGFIELD, ILLINOIS.

MOTOR FRAME AND GEAR.

No. 896,226.   Specification of Letters Patent.   Patented Aug. 18, 1908.

Application filed July 10, 1907. Serial No. 383,067.

*To all whom it may concern:*

Be it known that we, FREDERICK C. MILLER and OTTO BUTZKE, citizens of the United States, residing at Springfield, in the county of Sangamon and State of Illinois, have invented a new and useful Motor Frame and Gear, of which the following is such a full, clear, and exact description as will enable others skilled in the art to which it appertains to make and use our said invention.

This invention relates primarily to mine car motors, but obviously may be embodied in motors for other uses, without departure from our invention.

The purposes of our invention are to provide a six wheel truck equipped with three axles all connected to be driven by a single wheel of a prime mover mounted on the platform of the motor, said truck comprising two members viz: a main truck and a pony truck having a swivel connection with each other, and the main truck having a swivel connection with the platform; so that all of the wheels may readily adapt themselves to the curves or the inequalities of the track on which they run; and thereby attain the best adhesion of the wheels on the rails, to provide clutch mechanism controlling the direction of the run of the motor so that the motor may be caused to run either forward or backward at pleasure; to provide a roller bearing adapted to facilitate the oscillation of the pony truck; to provide simple and effective means for connecting the platform with the trucks; to provide simple and effective means for controlling the run of the chain driving the axle of the pony truck; and to provide simple and effective means for connecting the axle boxes with the truck-frames.

With these ends in view our invention consists in the novel features of construction and combinations of parts shown in the annexed drawings to which reference is hereby made, and hereinafter particularly described and finally recited in the claims.

Figure 2:
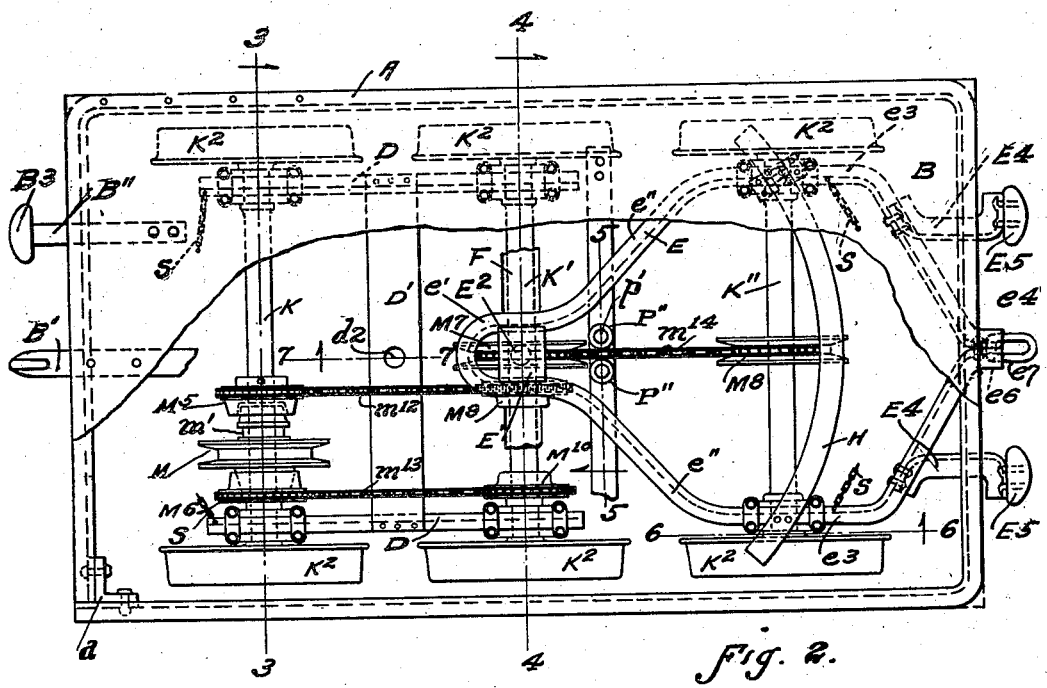
Figure 1:
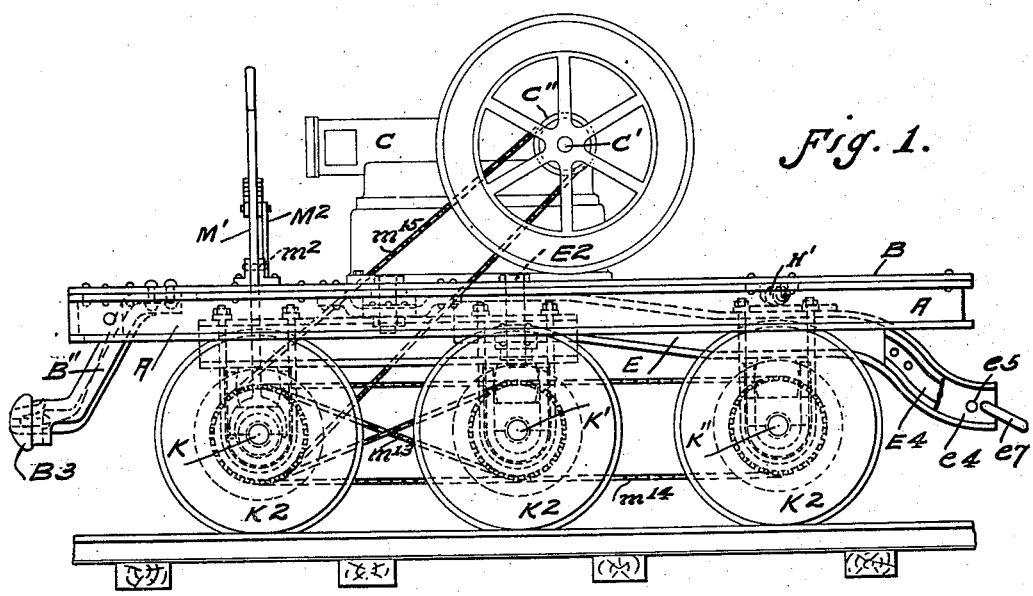
Figure 7:
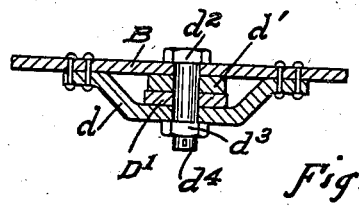
Figure 8:
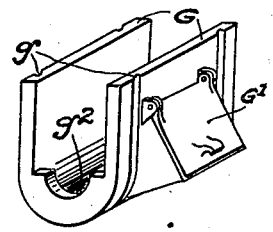
Figure 3:
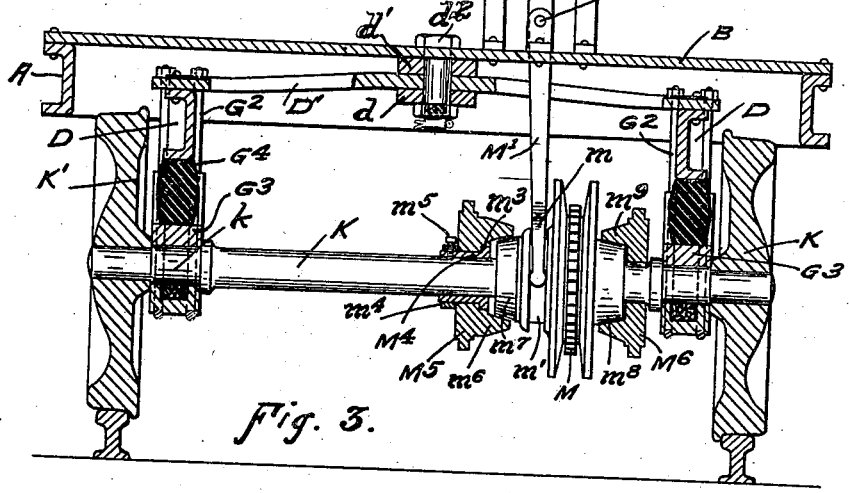
Figure 4:
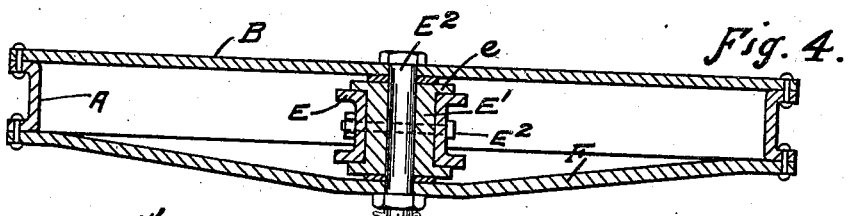
Figures 5, 6:
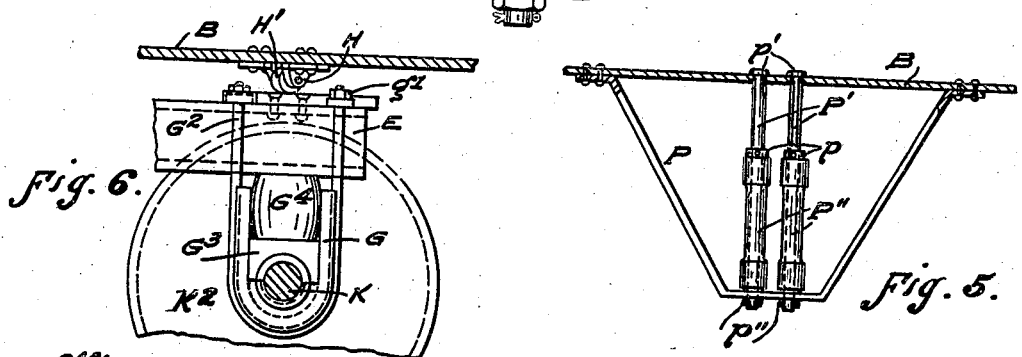

Referring to the drawings in which similar reference letters and characters designate like parts in the several views; Figure 1 is a side elevation of the complete apparatus; Fig. 2 is a top plan of the apparatus; part of the platform being shown as broken away, to expose the parts below the platform; Fig. 3 is an enlarged vertical transverse section on the line 3, 3, of Fig. 2; Fig. 4 is an enlarged partial vertical transverse section on the line 4, 4, of Fig. 2; Fig. 5 is an enlarged partial vertical section through the platform; and shows in elevation the chain guides and the means for supporting same; Fig. 6 is an enlarged partial vertical longitudinal section on the line 6, 6, of Fig. 2, Fig. 7 is an enlarged partial vertical section on the line 7, 7, of Fig. 2, and Fig. 8 is an enlarged detached isometric projection of one of the axle boxes.

The main frame A consists of a single channel bar bent to conform to the platform and having its ends secured together by an angle plate $a$; the floor or platform B is a single metal plate, preferably boiler plate, riveted or otherwise firmly secured on the frame A. The truck frames consist of two parts, viz.; a main truck and a pony truck having a pivotal connection with the main part, as hereinafter more fully described. The main part of the truck-frame comprises side bars D of channel iron of suitable dimension, connected by a cross bar D'. The cross bar D' passes through a stirrup $d$ (Fig. 7) secured on the under side of the platform B (Fig. 7). A washer $d'$ lies on top of the bar D'; a bolt $d^2$ extends through a hole in the cross bar D' and through a hole in the stirrup $d$ and has a nut $d^3$ and a pin $d^4$ securing the bolt in place and the cross bar D' oscillates on the bolt. The pony-truck frame comprises a channel bar E bent substantially as shown in Figs. 1 and 2. A block E' fits in the angle formed by the bent members of the bar E, and has flanges $e$ fitting on the bar E and preventing vertical displacement of the block. A bolt $E^2$ extends through the bar E and the block E' and secures the block on the bar. A plate F of suitable dimensions extends across and is secured on the under side of the platform and supports the block E'. A bolt $E^3$ extends through the platform B, the block E' and the plate F and connects the frame E with the platform B and the plate F.

The axle boxes of the main truck-frame and the pony truck-frame are identical in construction. One of the boxes and the means for connecting same with the truck-frame are clearly shown in Figs. 6 and 8. The box proper is a trough shaped structure G having a hinged gravitating door $G^1$ communicating with the interior of the box. The box G is secured on the bar E, or the bar D as the case may be, by strap bolts $G^2$ fitting in grooves $g$ in the walls of the box G and secured by nuts $g^1$. Brasses $G^3$ of the usual construction fit within the boxes G and upon the journals $k$ of the axles K. Springs $G^4$ of rubber or other suitable material, are situated between the bar E (or D as the case may be) and the brass $G^3$. The lower part of the box G has a depression $g^2$ to contain oil. That part of the box below the journal is filled with waste or other suitable material, which by capillary action supplies oil to the journal. Brackets H secured on the under side of the platform support rollers H′ which turn freely in bearings on the brackets and the rollers travel upon a segmental track $H^2$ secured on the bar E. The axles K K′ and K″ and the wheels $K^2$ are of the usual construction and the wheels are secured on the axle.

The prime mover C may be a steam engine, or gasolene engine, or other prime mover of suitable construction provided with a suitably located shaft C′ on which is secured the main drive wheel C″ (in this case a sprocket wheel). The sprocket wheel C″, M and $M^7$ and $M^8$ have flaring flanges as shown. The sprocket wheel M is in line with the wheel C″ and turns on the axle K. The wheel M has a circumferential groove $m'$ accommodating the fork $m$ of the shipper lever M′. The lever M′ oscillates on a bolt $m^2$ and is provided with a latch $m^3$ engaging in the notches of a quadrant $M^2$ to control the movement of the lever M′ in the usual well known manner. A sleeve $M^4$ is secured on the axle K and has a circumferential flange $m^3$. A ring $m^4$ fits around the sleeve $M^4$. A set screw $m^5$ connects the ring with the sleeve and secures the sleeve on the axle. A sprocket wheel $M^5$ turnable on the sleeve $M^4$, is kept in place by the flange $m^3$ and the ring $m^4$ and has an integral clutch member $m^6$ coacting with the clutch member $m^7$ of the wheel M. A sprocket wheel $M^6$ is fixed on the axle K and has an integral clutch member $m^9$ co-acting with the clutch member $m^8$ of the wheel M. Sprocket wheels $M^7$ and $M^8$, having flaring flanges, are secured on the axles K′ and K″ respectively, in line with each other. Sprocket wheels $M^9$ and $M^{10}$ are secured on the axle K′, in line with the sprocket wheels $M^5$ and $M^6$ respectively. A sprocket chain $m^{12}$ connects the wheels $M^5$ and $M^9$. A crossed sprocket chain $m^{13}$ connects the wheels $M^6$ and $M^{10}$. A sprocket chain $m^{14}$ connects the wheels $M^7$ and $M^8$, and a sprocket chain $m^{15}$ connects the main drive wheel C″ with the sprocket wheel M. A bracket P secured on the under side of the platform B supports vertical shafts P′. Spools P″ turn on the shafts P′. Collars $p$ on the shafts P′ prevent longitudinal movement of the spools on the shafts.

The shafts P′ may be of any approved construction; we prefer however to use shafts in the form of long bolts, passing through the platform B, and having heads $p'$, supporting the bolts on the platform and pins $p''$ extending through the bolts to prevent vertical displacement of the bolts. The chain $m^{14}$ runs between the spools P″ and the spools prevent the sprocket chain from running off of the wheel $M^8$ when the pony truck turns to the right or left as the case may be.

The central part $e'$ of the bar E is bent to fit around the block E′ as described. The members $e''$ of the bar E diverge from the block E′ and have intermediate parts $e^3$ parallel to the sides of the platform and upon which the axle boxes are secured and beyond the intermediate parts the members converge and form parallel parts $e^4$ which are secured together by rivets $e^5$ or equivalent securing devices. Holes $e^6$ extend through the part $e^4$ and accommodate a link $e^7$ for connecting the machine with the cars. Curved bumper bars $E^4$ are secured on the members E″ respectively, and bumper plates $E^5$, of suitable construction are secured on or near the lower end of the bars $E^4$. A draw bar B′ and bumper bars B″ of suitable construction are secured on the platform B. Bumper blocks $B^3$ are secured on the bars $B^2$.

For convenience in reciting in the claims the elements of the mechanism we hereby designate the axles K, K′ and K″ as the "first" "second" and "third" axles respectively; and the sprocket wheel C″ as the "main drive" sprocket wheel; the sprocket wheel M as the "first" (driven) sprocket wheel; the sprocket wheel $M^5$ as the "second" sprocket wheel; the sprocket wheel $M^6$ as the "third" sprocket wheel; the sprocket wheel $M^{10}$ as the "fourth" sprocket wheel; the sprocket wheel $M^9$ as the "fifth" sprocket wheel and the sprocket wheel $M^7$ as the "sixth" sprocket wheel and the sprocket wheel $M^8$ as the "seventh" sprocket wheel.

In the drawings a straight chain is shown connecting the sprocket wheels $M^5$ and $M^9$; and a crossed chain is shown connecting the wheels $M^6$ and $M^{10}$. The crossed chain may however be used to connect the wheels $M^5$ and $M^9$ and the straight chain may be used to connect the wheels $M^6$ and $M^{10}$, within the scope of this invention.

In practical use of the machine, the prime mover C being in motion; the chain $m^{15}$ running on the sprocket wheels C″ and M will drive the wheel M; and the clutch member of the wheel $M^5$ being in engagement with the corresponding clutch-member of the wheel M, will, by means of the chain $m^{12}$ running upon the wheels $M^9$, turn the axle K′; and the chain $m^{14}$ running on the wheels $M^7$ and $M^8$ will drive the axle K″; to cause the machine to travel forward. To cause reverse travel of the machine it is only necessary to move the shipper lever M′ to slide the wheel M out of engagement with the wheel $M^5$ and into engagement with the wheel $M^6$; whereupon the crossed chain $m^{13}$ traveling on the wheels $M^6$ and $M^{10}$ will cause the machine to travel rearward. In going around curves the pony truck-frame will turn on its swivel $E^2$ to adapt the wheels to the track. It will be observed that the axles K, K', and K'' all have direct connection by means of the sprocket chains $m^{12}$, $m^{13}$, and $m^{14}$ running on the sprocket wheels $M^5$, $M^9$, $M^6$, $M^{10}$, $M^7$ and $M^8$; hence the adhesion of all the wheels is constantly effective in propelling the machine. Stay-chains S connected with the truck frames and the platform prevent excessive lateral movement of the truck frames.

Having fully described our invention what we claim as new and desire to secure by Letters Patent is:

1. The combination of a main structure, a main truck-frame connected with the main structure; a pony truck-frame pivotally connected with the main structure; revoluble main axles connected with the main truck-frame; a pony axle connected with the pony truck-frame; a driver sprocket wheel secured on an axle of the main truck-frame; a driven sprocket wheel secured on the axle of the pony truck-frame; parallel revoluble spools in line with said driver sprocket wheel, means for turning the main axle, and a sprocket chain running on said sprocket wheels and traveling between said spools.

2. The combination of a main structure, a main truck-frame connected with the main structure; a pony truck-frame pivotally connected with the main structure, a revoluble first axle connected with the main truck-frame; a revoluble second axle connected with the main truck-frame; a revoluble third axle connected with the pony truck-frame, a first sprocket wheel loose on said first axle and having clutch members, a sleeve secured on said first axle, a second sprocket wheel turning on said sleeve and having a clutch member co-acting with a clutch member of said first sprocket wheel; a third sprocket wheel fixed on said first shaft and having a clutch member co-acting with a clutch member of said first sprocket wheel; a fourth sprocket wheel, a fifth sprocket wheel and a sixth sprocket wheel secured on said second shaft; a seventh sprocket wheel secured on said third axle; a sprocket chain connecting said second sprocket wheel with said fifth sprocket wheel, a crossed sprocket chain connecting said third sprocket wheel with said fourth sprocket wheel and a sprocket chain connecting said sixth sprocket wheel with said seventh sprocket wheel.

3. A pony truck-frame comprising the following elements, a bar bent to accommodate a block between the members of said bar, a block fitting between the members of said bar and axle boxes connected with said bar; in combination with a main structure, a main truck-frame connected with the main structure and a bolt pivotally connecting the block of said pony truck frame with the main structure, to permit horizontal oscillation of the pony truck under the main structure.

4. The combination of a platform, a fixed plate transverse to said platform, a pony truck-frame having branching members a block situated between the members of said pony truck-frame and a bolt passing through said platform, said block and said plate and pivotally connecting said block with said platform and said plate.

5. A pony truck comprising a bar having its central part shaped to conform to a block, members shaped at their ends to accommodate a draw bar and having intermediate parts shaped to accommodate axle boxes; in combination with a platform, a block fitting between the members of the pony truck-frame bar, means pivotally connecting said block with said platform, a draw bar connected with both members of said pony truck-frame bar and axle boxes secured on the intermediate parts of the members of said pony truck-frame bars.

In witness whereof we have hereunto subscribed our names at Springfield Illinois, this 25th day of June 1907.

FREDERICK C. MILLER.
OTTO BUTZKE.

Witnesses:
   FORDYCE W. BROWN,
   W. K. HALE.